United States Patent [19]
Penta et al.

[11] 4,454,188
[45] Jun. 12, 1984

[54] HIGH REFLECTIVITY IN FLOORING AND OTHER PRODUCTS

[75] Inventors: Vincent L. Penta, Newark; Joseph Boda, Fort Lee; Robert P. Conger, deceased, late of Rutherford by Phyllis M. Charlton, executor, all of H.J.

[73] Assignee: Congoleum Corporation, Kearny, N.J.

[21] Appl. No.: 519,892

[22] Filed: Aug. 4, 1983

Related U.S. Application Data

[63] Continuation of Ser. No. 338,184, Jan. 8, 1982, abandoned.

[51] Int. Cl.³ .......................... B32B 3/22; B32B 3/26; B32B 5/18
[52] U.S. Cl. ..................................... 428/172; 428/158; 428/159; 428/161; 428/164; 428/187; 428/201; 428/203; 428/209; 428/319.3
[58] Field of Search ................ 156/234, 240; 428/156, 428/158–161, 164, 172–174, 187, 195, 201, 203, 204, 209, 318.4, 319.3–319.9, 913, 914

[56] References Cited

U.S. PATENT DOCUMENTS

| | | | |
|---|---|---|---|
| 3,080,270 | 3/1963 | Lorenz | 156/233 |
| 3,235,395 | 2/1966 | Scharf | 156/233 |
| 3,293,094 | 12/1966 | Nairn et al. | 428/158 |
| 4,012,552 | 3/1977 | Watts | 428/200 |

FOREIGN PATENT DOCUMENTS 1085706  4/1978  Canada ............................... 428/411

*Primary Examiner*—Bruce H. Hess

[57] ABSTRACT

This invention relates to a method for producing a decorative reflective surface covering with improved adhesion of the various layers, having a backing, metallic areas and a transparent top layer, and the product thus produced. This product is produced by applying an adhesive on the surface of a backing in regular, spaced intervals, bringing a metal face of a film in contact with the adhesive to secure it to the backing, removing the metal film whereby the areas in contact with the adhesive remain on the backing and then applying a transparent layer to the surface of the backing covering the remaining metallic areas.

10 Claims, 4 Drawing Figures

HIGH REFLECTIVITY IN FLOORING AND OTHER PRODUCTS

This application is a continuation of application Ser. No. 338,184, filed Jan. 8, 1982 now abandoned.

BACKGROUND OF THE INVENTION

Various methods have been suggested for producing a decorative surface covering containing reflective elements. One such method is the lamination of a metalized mylar sheet to a backing, printing a design on the surface of the metalized sheet and then applying a transparent top coating. Another method has been the application of an adhesive to portions of a backing sheet, flocking metallic parts onto the sheet and then covering with a transparent top coating. Canadian Pat. No. 1,085,706 issued to L. E. Carpenter and Company is typical of such a process.

The difficulty in such processes is the obtaining of good adhesion between the top layer and backing and the metalized areas. Further, aging causes a weakening or complete destruction of the adhesive force. This can be caused by the migration of the plasticizer from the top layer into the adhesive layer. The process of the invention overcomes the disadvantages of prior art processes.

SUMMARY OF THE INVENTION

In accordance with the invention a decorative surface covering is produced utilizing a metal foil sheet. A surface covering product is printed with an adhesive in spaced areas where it is desirable to have reflective foil applied. A metal foil or film sheet is then super-imposed on the adhesive printed sheet with the metal foil in contact with the adhesive. The adhesive is then set to secure the metal foil to the base and thereafter the metal foil is stripped from the base. The portion of the metal foil in contact with the adhesive remains adhered to the base and only the other portions of the metal foil are removed. The product can then have a transparent wear layer applied over the adhered metal portions of the film and subjected to any other type of processing including the fusion of the wear layer. The wear layer readily adheres to the areas on which there is no metal foil and thereby encapsulates each piece of metal foil securely binding the metal foil piece to the base sheet. The resulting product has the appearance of a complete metal layer although it is a discontinuous sheet. The discontinuous nature of the sheet has distinct advantages. The portions of the metal film and the wear layer are adhered securely to the backing. Further it allows penetration of inhibitors to produce embossed products following the procedure of U.S. Pat. No. 3,293,094 which was issued Dec. 20, 1966 to Nairn et al.

DESCRIPTION OF THE INVENTION INCLUDING PREFERRED EMBODIMENTS

Figure 1:
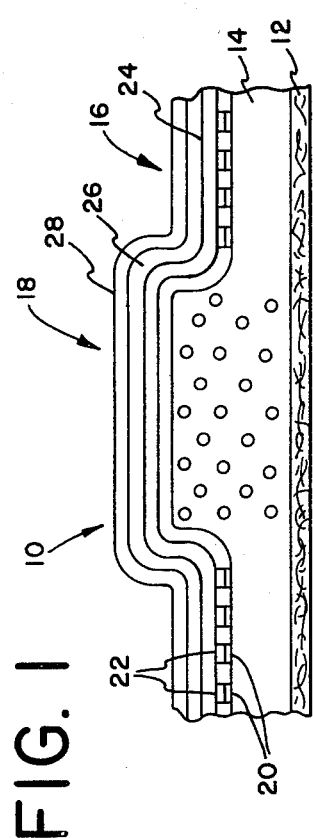
FIG. 1 is a cross section view of a decorative product made in accordance with the invention.

In one aspect the invention resides in a surface covering and a process for the production thereof. The surface covering comprises, in superimposed relationship,
 (1) a backing sheet which can be a fibrous felt or a polymer composition sheet,
 (2) a background or coating atop of the backing,
 (3) an adhesive, discontinued coating,
 (4) portions of a metal film surface on one side thereof adhered to the adhesive,
 (5) a printed decoration,
 (6) a clear, transparent, or translucent wear layer, through which the printed decoration and at least some of the metal film portions are visable.

In a further aspect of the invention there is provided a method for the production of the surface covering as defined above which comprises
 (a) coating a backing sheet with a resinous composition,
 (b) drying the resultant coated backing,
 (c) applying by a rotogravure or silk-screen method an adhesive composition in a discontinuous pattern,
 (d) drying said adhesive coating,
 (e) adhering a metal film on one surface thereof, to the adhesive coating,
 (f) setting the metal in the adhesive,
 (g) stripping the metal film from the backing leaving portions of the metal film affixed to the adhesive on the base,
 (h) applying a printed design,
 (i) applying a wear layer to cover the portions of the metal film and printed design,
 (j) heating to fuse the wear layer.

Referring to the drawings, in one embodiment of the invention, a decorative sheet is produced, generally indicated at 10, having a backing 12 which can be asbestos fiberous sheet, a resinous composition foam layer 14 having depressed areas, generally indicated at 16 and raised areas, generally indicated at 18, a discontinuous adhesive layer 20 on the upper surface of the foam layer, comprising small areas of adhesive, a metal sheet 22, adhering to the surface of the adhesive layer, and coextensive with each of the small areas of adhesive, a printed design 24, covering the metal areas and the surface of foam layer, and a resinous composition wear layer 26, covering the printed design and if desired the top coating 28 of polyurethane composition.

Figure 2:
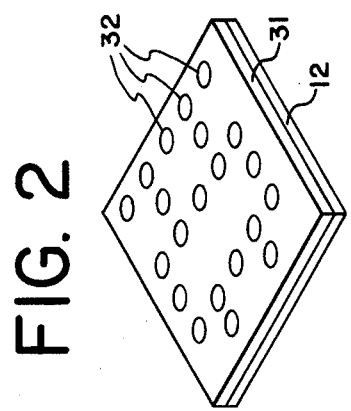
FIG. 2 is a schematic illustration of the apparatus for carrying out the invention techniques herein.
Figure 3:
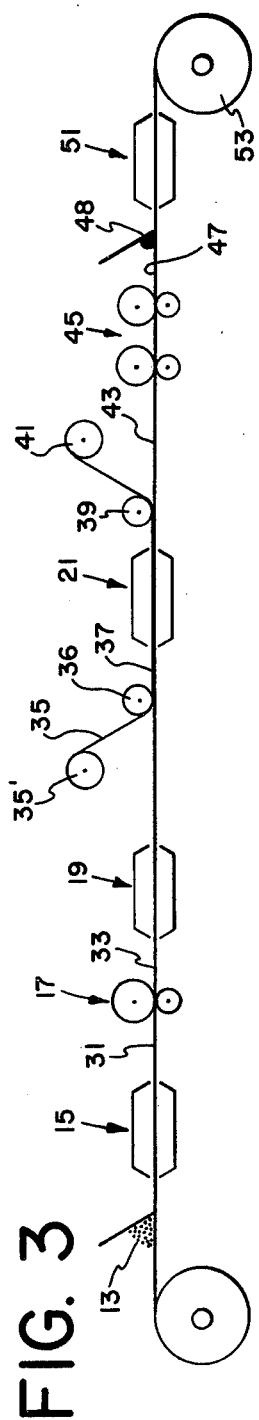
FIG. 3 is a perspective view showing the location of the adhesive application.
Figure 4:
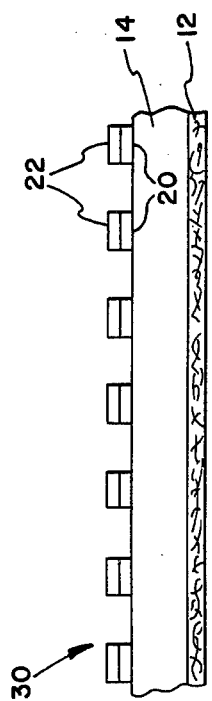
FIG. 4 is a cross section view of an intermediate product showing metallic film pieces secured to the adhesive.

One of the embodiments for producing the decorative product of the invention is shown in FIG. 2. A felt backing sheet is coated with a vinyl chloride resin composition containing a blowing agent 13. The coating is passed through an oven generally indicated at 15, which heats the coating to solidify. The gelled coating 31, is then passed through one station press generally indicated at 17, which applies adhesive 20, on the surface of the gelled coating in the form of a rotogravure print of fine separate dots, squares or other shapes 32, of adhesive which can be in the form of a pattern, i.e. only on some areas of the gelled sheet. This can be seen by referring to FIG. 3. The printing inks can utilize pigments or dyes (transparent translucent or opaque) for coloration. The adhesive coated sheet 33, is then passed through an oven generally indicated at 19 to tackify the adhesive. A vacuum metalized film 35, more fully described hereinafter is unwound from a supply roll 35' and brought into contact with the adhesive by means of pressure roll 36. The composition 37 is then passed through a cooling zone generally indicated at 21 to solidify the adhesive. The metal film is then stripped from the base sheet by passing around take-off roll 39 and winding on collector roll 41. Portions of the metal film adhering to the adhesive remain in contact with the adhesive and the stripping action removes only the portions of the metal film which are not in contact with the adhesive. The sheet 43, with the adhering metal portions of the sheet are passed through a rotogravure press generally indicated at 45 for applying a decorative design to the surface of the sheet. The decorated sheet 47 is then coated with a wear layer 26 by use of a reverse roll coater or doctor blade 48, and passed through an oven generally indicated at 51. This latter oven is heated to fuse the wear layer and decompose the blowing agent to produce the finished product which is collected on roll 53. As an alternate procedure a decoration can be printed on the base prior to application of the metal film.

The Backing Sheet Material

A relative flat, backing web or sheet material may be used, if so desired or required, as the fibrous backing sheet material or substrate 12, the most common in the industry being a fibrous, felted asbestos or cellulosic sheet. Many other types and forms of fibrous backing sheet materials are, of course, utilizable within the scope and spirit of the present invention and many of these materials are described in the prior art, such as in U.S. Pat. No. 3,293,094. Such fibrous backing sheet materials do not relate to the essence of the present invention and may be omitted if so desired. The backing can also comprise a resinous layer as hereinafter defined or a fabric of natural or synthetic materials.

The Resinous Polymer Composition Layer

The resinous polymer composition layer 14 may comprise a potentially foamable or non-foamable resinous polymer composition which may be made by well-known conventional and standard methods and techniques and may contain one or more synthetic resins, preferably a polymer, copolymer, homopolymer, or terpolymer of vinyl chloride, as the main constituent.

Although polyvinyl chloride is the preferred and typical resin, many other synthetic resins are equally applicable. The specific synthetic resins which are used do not relate to the essence of the present invention and many other suitable resins are set forth in the previously cited U.S. Pat. No. 3,293,094.

Of particular use are the copolymers of vinyl chloride with vinylidene chloride or with esters such as vinyl acetate, vinyl propionate, vinyl butyrate, or alkyl substituted vinyl esters. The copolymers of vinyl chloride with various acrylic compounds, such as acrylic acid and methacrylic acid and the esters thereof are also of use. Other resins such as polystyrene, substituted polystyrenes, polyolefins such as polyethylene and polypropylene acrylates and methacrylates, polyamides, polyesters etc., are also applicable to the principles of the present invention.

Also, although such resins are preferably used as plastisols in the form of a dispersion or suspension of the resin in a plasticizer therefor, aquasols or aqueous latices and organsols are of use in which the dispersing or suspending medium is water or an organic solvent.

A few preferred and typical plasticizers used in the formulation of such plastisols are dibutyl sebacate, dioctyl sebacate, butyl benzyl sebacate, dibenzyl sebacate, dioctyl adipate, didecyl adipate, dibutyl phthalate, dicapryl phthalate, dioctyl phthalate, dibutoxy ethyl phthalate, butyl benzyl phthalate, dibenzyl phthalate, di (2-ethylhexyl) phthalate, alkyl aryl modified phthalate esters, alkyl aryl hydrocarbons, tricresyl phosphate, octyl diphenyl phosphate, dipropylene glycol dibenzoate, dibasic acid glycol ester, epoxidized soya oil, epoxidized tall oil esters, and many other primary and secondary plasticizers.

Other constituents of the resinous polymer composition include: a blowing or foaming agent, such as azodicarbonamide, if a blowing or foaming procedure is desired; various accelerators, initiators, or catalysts such as diabasic lead acetate, dibasic lead phosphate, etc.; various heat and light stabilizers such as dibasic lead phosphite, phenyl phthalate, etc.; UV absorbers; colorants such as dyes and pigments, particularly titanium dioxide; solvents and diluents such as methyl ethyl ketone, methyl isobutyl ketone, dodecyl benzene, etc.; fillers such as clay, limestone, etc.; viscosity improvers; anti-oxidants; bacteriostates and bacteriocides; etc.

The specific nature and the particular physical properties and characteristics of the various constituents of the resinous polymer composition do not relate to the essence of the present inventive concept and further specific elaboration of such additives is believed unnecessary and not required. All of these constituents are well known and conventional in the industry and many are set forth in the previously cited U.S. Pat. No. 3,293,094.

The thickness of the resinous polymer composition, as it is applied to the backing sheet material and is still wet, is in the range of from about 0.005 inch to about 0.060 inch.

After the resinous polymer composition has been applied to the backing sheet material, it is then heated in an oven or other suitable heating apparatus maintained at an elevated temperature of from about 240° F. to about 450° F., and preferably from about 260° F. to about 410° F., for a period of time of from about 1 minute to about 5 minutes, whereby it gels and becomes firm. The temperature and the time are interdependent and the higher the temperature, the shorter the time, and vice versa. The elevated temperature, however, is not that high as to activate or decompose any blowing or foaming agent which may be included in the formulation of the resinous polymer composition as to cause blowing or foaming at this time.

Adhesive Layer

The resultant material is next placed through a printing apparatus such as a gravure printing machine, and the adhesive is applied to the smoothed, coated surface of the base. A tint such as 0.5% of carbon black can be added to the adhesive in order to assure by visual detection that this adhesive remains on the base during subsequent treatment. The adhesive is deposited using any suitable cylinder such as a gravure cylinder having 55 l.p.i. quadrahelic etch at the required level and dried.

It is preferred to utilized a heat-sensitive layer. Any adhesive which conforms to this definition may be used with such materials as 85–88% vinyl chloride, 11–14% vinyl acetate, 0.8–1.2% maleic acid terpolymers and the like being exemplary.

The adhesive coated product is then preheated by passing it through an oven or heated drum (e.g., at about 320° F.) with the back uncoated portion of the sheet in contact with the drum. At a point about ⅓ around the circumference of the drum, the coated surface of the article is brought into contact with the metalized polyethylene terephthalate film, the coated face of the base being in contact with the metalized film. The two webs continue around the heated drum and are then fed between the smooth rollers of a laminating nip press. Web temperature is controlled at about 270° F. and the laminate is consolidated into a unitary structure at about 40 pli pressure on the chilled nip rollers. The film carrier is then cooled to ambient conditions and stripped from the backing.

A design is then printed on the surface including on the metal portions using conventional gravure printing cylinders and vinyl inks if desired. The printed design may form a background of a design different from that of the metallic particles, an outline design or the same or an independent design.

The Metallic Layer

The metallic layer is preferably a vacuum metalized polyethylene terephthalate film ranging in thickness from about 0.0005 to about 0.005 inch. It has a metal film of about 1 to about 10 micron of which aluminum is preferred. Other metals such as copper, nickel etc. can be used. The metal film is thin and is applied onto the polyethylene terephthalate by vacuum deposition as is known in the art. The polyethylene terephthalate film is preferably biaxially oriented and is also known in the art. The metal film can be colored.

The metallic carrier film, as described above, is applied to the base with the metal side facing said base by heat and/or pressure. As an alternative, the adhesive can be applied to the metalized film rather than on the base layer and then laminated to the base.

Lamination and Stripping

The next step in the process is the lamination of the metal sheet to the adhesive coated base with the metal surface in contact with the adhesive. Prior to this lamination the adhesive is tacktified. The system for accomplishing this will depend on the nature of the adhesive. If the adhesive is a thermoplastic or thermo setting then the tacktificiation can usually take place by applying heat. In any event the metal film is brought into contact with the tacktified adhesive and passed through a compressor roller which forces the metal sheet into contact with the adhesive. The adhesive is allowed to solidify such as by cooling and then the carrier sheet is stripped from the base. Because of the adhesive those areas of the metal film in contact with the adhesive will remain on the surface of the base, the carrier film removed therefore has areas of metal missing, corresponding to the areas which remain adhered to the base. The carrier sheet is wound on a collecting roller. As indicated above, as an alternate procedure, the adhesive can be applied to the carrier sheet and then the adhesive coated metallic carrier brought into contact with the base. As a general rule the base sheet area covered should not exceed 80% of the surface of the base.

Decorative Print

A print design can be applied to the surface layer, utilizing any conventional gravure printing equipment. The use of vinyl inks is preferred, however, any other type of ink which enables the design to be readily printed onto the polyester surface may be used such as acrylic gravure printing inks and the like.

The Printing of the Resinous Polymer Composition

The gelled and firmed resinous polymer composition after removal of the unwanted carrier film can then be printed or coated with a printing ink composition containing a colorant such as a dye or a pigment, if a design or a pattern is desired or required to appear in the final product. The printing composition may also contain resins, plasticizers, stabilizers, anti-oxidants, blowing or foaming inhibitors in selected areas, etc. Drying or hardening of the applied printing ink composition can be accomplished by air-drying, or by conventional heating procedures. Preferred and typical printing ink compositions are to be noted in the previously cited U.S. Pat. No. 3,293,094. The printing could be beneath the metalized area for certain design effects.

The Wear Layer

The relatively flat, resinous polymer composition wear layer 16 has an average thickness of from about 0.002 inch to about 0.025 inch and is applied substantially uniformly to the surface of the printed, gelled and firmed resinous polymer composition 14. The wear layer 16, in normal practice, is usually a clear, unpigmented resinous polymer composition and its basic purpose is customarily to give to the resilient floor covering improved wearing qualities. Many of the constituents of the previously described non-foamable resinous polymer compositions are also present in the formulation of the wear layer 16, notably the polyvinyl chloride polymers, or the other previously mentioned polymers, as well as plasticizers, stabilizers, etc. Blowing or foaming agents and pigments or dyes are normally omitted. Typical formulations of preferred and typical wear layers 16 are to be found in the previously cited U.S. Pat. No. 3,293,094. After the wear layer 16 has been applied to the printed, gelled and firmed resinous polymer composition 14, it is then heated in an oven or other suitable heating appratus maintained at an elevated temperature of from about 240° F. to about 410° F., and preferably from about 260° F. to about 410° F. for a period of time of from about 1 minute to about 5 minutes, whereby it gels and becomes firm. Again, the temperature and the time are interdependent and no blowing or foaming may take place at this time.

If desired, the preceding gelling and firming process may be combined with a fusing and blowing or foaming process by heating to a higher temperature, the specific temperatures of each process being dependent upon the chemical and physical properties and characteristics of the resinous polymer composition 14 and the wear layer 16, the specific synthetic resins therein, and the nature of the blowing or foaming agent employed. Under normal conditions, fusing and blowing or foaming may take place by exposure to elevated temperatures of from about 250° F. to about 460° F. and preferably from about 270° F. to about 420° F. for periods of time from about 2 minutes to about 10 minutes.

The resulting product is shown in FIG. 1 wherein there is illustrated a blown resinous polymer sheet material generally indicated at 20 comprising a fibrous backing sheet material or substrate 22 upon which has been deposited and adhered a blown resinous polymer composition layer 24, on top of which has been deposited a now uniform layer of a metallized sheet adhered by an adhesive and adhered another relatively flat, resinous polymer composition wear layer 26, and a top coating 28 to be described more fully hereinafter.

And, if blowing or foaming inhibitors were used in order to modify the blowing or foaming effects, the resulting product is shown in FIG. 1 wherein there is illustrated a blown and embossed resinous polymer sheet material generally indicated at 30 comprising a fibrous backing sheet material or substrate 32 upon which has been deposited and adhered a blown resinous polymer composition layer 34, on top of which has been deposited and adhered another relatively flat, but now embossed, resinous polymer composition wear layer 36, and a top coating 38 comprising lands or higher portions 37 and mortars or lower portions 39, which will be described in greater detail hereinafter.

THE TOP COATING

A top coating 28 or 38 which can be applied to the firmed and gelled or fused surface of the wear layer 26 or 36 comprises a polyurethane composition layer to give the product greater gloss retention. Such a top coating is described in U.S. Pat. No. 4,059,709.

The following example is set forth for purposes of illustration only and is not to be construed as a limitation on the present invention. All parts and percentages are by weight unless otherwise specified.

EXAMPLE 1

A relatively flat, fibrous felt backing sheet of 0.030 inch thick asbestos fibers is impregnated with 5% of a ureaformaldehyde resin and 25% of a copolymer of butadiene and acrylonitrile. The resin-impregnated asbestos fiber sheet is then heated to cure the resin. In addition, the asbestos fiber sheet is coated on one surface with a size of one-half methyl methacrylate and one-half butyl acrylate in an amount equal to 0.025 pounds per square yard, followed by a drying of the size coat.

A foamable plastisol coating composition is applied substantially uniformly to the surface of the sized backing sheet material at an average thickness of about 0.010 inch. The plastisol has the following formulation:

|  | Parts |
|---|---|
| Polyvinyl chloride, dispersion grade, specific viscosity 0.6 | 50 |
| Polyvinyl chloride, dispersion grade, specific viscosity 0.4 | 50 |
| Butyl benzyl phthalate plasticizer | 52 |
| Alkyl aryl hydrocarbon secondary plasticizer | 18 |
| Azodicarbonamide blowing agent | 3 |
| Zinc oxide stabilizer-accelerator | 2 |
| Titanium dioxide pigment | 5 |

The plastisol coating composition is heated and gelled to a firm condition in an oven maintained at an elevated temperature of about 300° F. The exposure time for the heating is about three minutes.

The sheet is then passed through one station of a rotogravure press which applies an adhesive having the following composition in designated areas:

|  | Parts |
|---|---|
| Nitril synthetic rubber with phenolic modification (22% solids) (G414 of National Startch and Chemical Company, Bloomfield, N.J.) | 50 |
| Methyl ethyl ketone | 50 |

Since the adhesive is applied by a rotogravure roll, it is formed of a series of dots or squares of about 120 line screen. Approximately 75% of the surface of the base was covered with adhesive.

The adhesive coated sheet is then heated to tacktify its adhesive and a metalized carrier film is pressed with the metal side against the adhesive by passing through pressure rollers which exert a pressure of about 40 pounds. The metal carrier film consists of a 0.0005 inch biaxially oriented film of polyethylene terephthalate having on one side thereof a thin, vacuum deposited aluminum layer. The adhesive is then cooled to solidify and adhere the metal side of the carrier film to the base. The carrier film is then stripped from the surface by passing around rollers. The metal in contact with the adhesive readings adhered to the base and the remainder of the metallic surface is removed and the carrier film wound on a take up roller.

The sheet is then printed with a pattern utilizing printing inks having the following formulations with the parts by weight:

|  | Parts |
|---|---|
| Inhibitor Printing Ink |  |
| Vinyl chloride-vinyl acetate copolymer | 8.5 |
| Methyl ethyl ketone | 51.5 |
| Pigment (Titanium dioxide pigment 55% solids) | 25.0 |
| Trimetellitic anhydride inhibitor | 15.0 |
| Printing Ink |  |
| Vinyl chloride-vinyl acetate copolymer | 13.5 |
| Methyl ethyl ketone | 61.5 |
| Pigment | 25.0 |
| No inhibitor | 0.0 |

The applied printing ink compositions are dried.

A wear layer composition having the following formulation by weight is then applied over the surface of the printed sheet, substantially uniformly to an average thickness of about 0.015 inch.

|  | Parts |
|---|---|
| Polyvinyl chloride, dispersion grade, specific viscosity 0.5 | 95.0 |
| Polyvinyl chloride, suspension grade, specific viscosity 0.35 | 5.0 |
| Alkyl aryl modified phthalate ester plasticizer | 38.0 |
| Epoxidized tall oil ester secondary plasticizer | 5.0 |
| Stabilizer | 3.0 |
| Viscosity control agent | 1.2 |
| Dibutyl tin dilaurate | 0.11 |

The composite product is then heated in a fusion oven maintained at an elevated temperature of about 385° F. for a period of exposure time of about 2 minutes and 45 seconds. Fusion of the polyvinyl chloride resins takes place, along with the decomposition or activation of the azodicarbonamide blowing or foaming agent and the plastisol composition is blown or foamed and embossed in accordance with the printed pattern or design containing designated areas with trimellitic anhydride inhibitor therein and other designated areas not containing any inhibitor.

The resulting product has a metallic appearance in the areas of metallic foil and transparent inks. The product is also found to possess good resistance to abrasion, good flexibility and impact resistance, good toughness, good high gloss retention, good surface texture and improved adhesion of wear layer to metalized substrates.

EXAMPLE 2

The procedures of Example 1 were followed except that the adhesive was applied to the metal side of the metallic sheet instead of to the foamable base coating. The adhesive utilized was a vinyl chloride-vinyl acetate compound (86/14).

The procedures of Example 1 were followed except that the adhesive is applied overall and a metallized carrier sheet, which has already been used (removing about 50% of the metal), is pressed against the adhesive. This example, shows the multiple use of the metallized sheet to reduce costs. If only certain separated areas require high reflectivity, the metallized sheet can be used several times.

EXAMPLE 4

A foamable plastisol coating is applied substantially uniformly to the surface of a 6 mil paper of the type typically used for wall covering at an average thickness of about 0.005 inch. The plastisol has the following formulation:

|  | Parts |
| --- | --- |
| Polyvinyl chloride, dispersion grade, specific viscosity 0.5 | 50 |
| Polyvinyl chloride, dispersion grade, specific viscosity 0.36 | 25 |
| Polyvinyl chloride, suspension grade blending resin, specific viscosity 0.3 | 25 |
| Bentyl benzyl phthalate plasticizer | 37.5 |
| Alkyl aryl hydrocarbon secondary plasticizer | 12.5 |
| Diethyl hexyl phthalate plasticizer | 10 |
| Azodicarbonamide blowing agent | 4 |
| Zinc oxide stabilizer-accelerator | 1 |
| Titanium dioxide pigment | 8.5 |

The plastisol coating composition is heated and gelled to a firm condition in an oven maintained at about 300° F. for about three minutes. The sheet is then passed through a one station rotogravure press which applies in designated areas an adhesive having the following composition:

|  | Parts |
| --- | --- |
| BONDMASTER G414-22* | 50 |
| Methyl ethyl ketone (used to adjust to a workable viscosity - about) | 50 |

*G414-22 is an amber-tan nitrile synthetic rubber/phenolic resin composition (22% solids) in methyl ethyl ketone with a viscosity of about 650 cps.

The adhesive coated sheet is dried. It is then heated to 250° F.–300° F. to tackify the adhesive and a metallized carrier sheet is pressed with the metal side against the adhesive by passing through pressure rolls which exert about 40 pounds of pressure. After cooling, the carrier sheet is stripped from its surface. The metal adheres to the adhesive giving a discontinuous metal film on the vinyl substrate. The sheet is then printed as described in Example 1. Or, as is quite common for wall coverings, it could be silk screen printed in the desired design using silk screen printing inks.

A wear layer composition is then applied over the surface of the printed sheet, substantially uniformly to an average thickness of 2 mils. The wear layer has the following formulation:

|  | Parts |
| --- | --- |
| Polyvinyl chloride, dispersion grade, specific viscosity 0.6 | 95 |
| Polyvinyl chloride suspension grade, specific viscosity 0.35 | 5 |
| Bentyl benzyl phthalate plasticizer | 30 |
| Alkyl and hydrocarbon secondary plasticizer | 10 |
| 2,2,4-trimethylpentanediol-1,4 benzoate isobutyoate | 20 |
| Epoxidized tall oil ester secondary plasticizer | 5 |
| Viscosity control agent | 1 |
| Stabilizer | 3 |

The composite product is then heated in an oven at about 385° F. for about 2½ minutes.

Fusion of the polyvinyl chloride resins takes place, along with the decomposition or activation of the azodicarbonamide blowing or foaming agent and the plastisol composition is blown or foamed and embossed in accordance with the printed pattern or design containing designated areas with trimellitic anhydride inhibitor therein and other designated areas not containing any inhibitor.

The resulting product has a metallic appearance in the desired areas. The product is also found to possess good resistance to abrasion and scuffing, good flexibility and toughness and good surface texture.

Although the present invention has been described in great particularity in the preceding specific examples wherein there are shown preferred and typical embodiments of the inventive concept, such is not to be construed as limitative of the broader aspects of the inventive concept but only illustrative thereof. The specific materials, chemicals, patterns, designs and other particular aspects of such examples are simply illustrative and do not limit the broader scope of the invention which is limited and defined by the scope and the spirit of the appended claims.

What is claimed is:

1. A decorative surface covering having a metallic appearance comprising a base sheet, a first layer of resinous composition on one surface of the base sheet, an adhesive coating located on said first layer in the form of a plurality of spaced-apart fine discrete dots or other shapes such that the resinous composition is exposed to view in the areas not covered with adhesive dots, a plurality of discontinuous metal films covering only said discrete adhesive dots, and a transparent or translucent second resinous composition surface wear layer covering and surrounding each metal film and fused directly to said first resinous composition thereby encapsulating each discrete metal film and securely binding it to the base sheet.

2. The decorative surface covering according to claim 1 wherein said metallic films cover less than 80% total surface area.

3. The decorative surface covering according to claim 2 wherein said adhesive coating is in the form of rotogravure or other type print.

4. The decorative surface covering according to claim 3 wherein said metallic films are vacuum metalized films.

5. The decorative surface covering according to claim 2 wherein said base sheet is a fibrous felt sheet.

6. The decorative surface covering according to claim 2 wherein said first layer of resinous composition is a resin composition foam layer.

7. The decorative surface covering according to claim 2 wherein the resin composition wear layer is a polyvinyl chloride composition.

8. The decorative surface covering according to claim 2 wherein said metallic films have a thickness of from about 1 to about 10 microns.

9. The decorative surface covering according to claim 8 having a decorative layer on the upper surface of said metallic films.

10. The decorative surface covering according to claim 8 having depressed areas on the upper surface of said surface covering.

* * * * *

UNITED STATES PATENT AND TRADEMARK OFFICE
CERTIFICATE OF CORRECTION

PATENT NO. : 4,454,188
DATED : June 12, 1984
INVENTOR(S) : Penta, et al.

It is certified that error appears in the above—identified patent and that said Letters Patent is hereby corrected as shown below:

On the face of the patent, Item 75 (Inventors)

should read:

[75] Inventors: Vincent L. Penta, Newark; Joseph Boda, Fort Lee; Robert P. Conger, Park Ridge; and Ralph W. Charlton, deceased, late of Rutherford, by Phyllis M. Charlton, executor; all of N.J.

Signed and Sealed this

Twenty-sixth Day of February 1985

[SEAL]

Attest:

DONALD J. QUIGG

Attesting Officer

Acting Commissioner of Patents and Trademarks